(12) United States Patent
Huang et al.

(10) Patent No.: US 9,306,394 B2
(45) Date of Patent: Apr. 5, 2016

(54) DISTRIBUTED LOAD CURRENT SENSING SYSTEM

(71) Applicant: Shun-Fu Technology Corp., Taipei (TW)

(72) Inventors: Yung-Sheng Huang, Taipei (TW); Shun-Hua Lee, Taipei (TW)

(73) Assignee: SHUN-FU TECHNOLOGY CORP., Taipei (TW)

( * ) Notice: Subject to any disclaimer, the term of this patent is extended or adjusted under 35 U.S.C. 154(b) by 52 days.

(21) Appl. No.: 14/326,450

(22) Filed: Jul. 8, 2014

(65) Prior Publication Data

US 2015/0022261 A1 Jan. 22, 2015

(30) Foreign Application Priority Data

Jul. 18, 2013 (TW) .............................. 102125658 U

(51) Int. Cl.
*H03B 1/00* (2006.01)
*H03K 5/00* (2006.01)
*H04B 1/10* (2006.01)
*H02J 3/18* (2006.01)

(52) U.S. Cl.
CPC *H02J 3/18* (2013.01); *H02J 3/1821* (2013.01)

(58) Field of Classification Search
CPC ...... H04B 15/005; H04B 1/1623; G05F 1/52; G10H 3/182; H01J 1/135
USPC ...................................... 327/551–559; 363/41
See application file for complete search history.

(56) References Cited

U.S. PATENT DOCUMENTS

| | | | | |
|---|---|---|---|---|
| 5,677,832 | A * | 10/1997 | Tissier et al. | 363/41 |
| 7,787,267 | B2 * | 8/2010 | Wu et al. | 363/39 |
| 8,363,433 | B2 * | 1/2013 | Zhang | 363/39 |
| 2009/0021964 | A1 * | 1/2009 | Hsu et al. | 363/41 |

* cited by examiner

*Primary Examiner* — Quan Tra
(74) *Attorney, Agent, or Firm* — Guice Patents PLLC

(57) ABSTRACT

A distributed load current sensing system being connected to a power input terminal that is connected to a main power trunk that has one or multiple load branches connected thereto is disclosed to include a power bus connected to the main power trunk, an active power filter connected to the power bus and a load current sensor device coupled with each load branch for sensing the load current of each load branch and providing the sensed signal to the active power filter so that the active power filter can generate a compensation signal accurately.

6 Claims, 8 Drawing Sheets

DISTRIBUTED LOAD CURRENT SENSING SYSTEM

BACKGROUND OF THE INVENTION

1. Field of the Invention

The present invention relates to active power filter technology and more particularly, to a distributed load current sensing system for compensating the harmonic signal and virtual work of each linked load branch.

2. Description of the Related Art

With recent advances in technology, a large number of non-linear load devices are used in inverters, lighting equipment, etc., to enhance the effectiveness and convenience. However, these non-linear load devices also bring a lot of power pollution problems of which harmonic problems are the most severe problems. In order to solve harmonic problems, the conventional measure is to install a power filter in each nonlinear load device.

Regular power filters include two types, namely, the passive power filters and the active power filters. Conventional passive power filters are commonly composed of inductors and capacitors, having the advantages of simple structure and low cost and the disadvantages of large size, heavy weight, being capable of eliminating fixed harmonic only, limited improvement in power factor and being likely to resonate with the power system. Conventional active power filters can effectively inhibit all current harmonics and improve the power factor of the power supply side.

When taking the needs of regular systems into consideration and in order to improve system reliability and to increase system capacity and expandability, active power filters will normally be used. For example, in the load current sensing system shown in FIG. 1, multiple small scale power filters are connected in parallel to the main power trunk.

Many parallel operation of active power filter designs for load current sensing system application are known. These designs can be divided into many groups, i.e., the independent parallel detection method, the load current distribution method, the multiple active power filter-based multi-frequency current compensation method, the multi-frequency switching method and the load information transmission control method. Every power filter control method has its advantages and disadvantages. In the load information transmission control method as shown in FIG. 2, active power filters are respectively installed in respective load branches for compensating different harmonic currents and virtual work. This design can use the power network to transmit information directly, allowing communication with every active power filter so that the active power filters in different load branches can compensate one another to enhance system efficacy. However, distributed active power filters will cause inconvenience in system maintenance and management. Further, the harmonic compensation function of the active power filters can attenuate the message transmission power of the power network. While considering the respective advantages and disadvantages of the aforesaid various active power filter designs, the problems of centralized management and distributed management should also be taken into account.

In a centralized management design as shown in FIG. 3, all active power filters are installed in the power room of the power input terminal and connected in parallel to the main power trunk in front of the load branch to simplify the architecture and management. The installation environment helps prolong the lifespan of the active power filters. In this centralized management design only the main power trunk between power input terminal and the active power filters is maintained clean, and the power network posterior to the active power filters is contaminated with harmonic waves. The centralized active power filters are adapted for detecting the total load current in the main power trunk for the generation of a harmonic compensation signal. However, the total load current can be several amps to several thousands of amps or even up to ten thousands of amps subject to the status of use of the load side power equipment. At this time, a certain degree of detection error can occur due to an excessively large sensing range. The distributed management design shown in FIG. 4 can compensate the drawbacks of the aforesaid centralized management design, keeping the entire power network clean. However, this distributed management design has the drawback of installation environment instability. Further, in this distributed management design, every active power filter can simply control one respective load branch. For enabling the active power filters to support one another, a complicated signal processing and transmitting measure is necessary, leading to management and maintenance inconvenience and shortening the lifespan of the active power filters.

SUMMARY OF THE INVENTION

The present invention has been accomplished under the circumstances in view. It is therefore the main object of the present invention to provide a distributed load current sensing system has a load current sensor device directly installed in each linked load branch to detect the load current and to feed back the detected signal to an active power filter so that the active power filter can generate a compensation signal accurately, providing a clean electricity network that the advantages of centralized management and distributed management, simplifying power management, achieving maximum system efficacy and prolonging the lifespan of the active power filter.

To achieve this and other objects of the present invention, a distributed load current sensing system in accordance with the present invention is connected to a power input terminal that is connected to a main power trunk that has connected thereto at least one load branch. The distributed load current sensing system comprises a power bus electrically connected to the main power trunk, and an active power filter electrically connected to the power bus. The active power filter comprises a signal processor unit adapted to analyze each received signal and output a corresponding signal, a driving circuit unit electrically connected to the signal processor unit for receiving the output signal of the signal processor unit and outputting a corresponding driving signal, a power unit electrically connected to the driving circuit unit for receiving the driving signal and generating a corresponding compensation signal, and a load current sensor device electrically connected to the load branch. The load current sensor device comprises a control unit and a load current sensing unit. The control unit is electrically coupled with the load current sensing unit. The load current sensing unit is adapted for sensing the load current of each load branch and transmitting each sensed signal to the control unit and then the active power filter. The active power filter is adapted for generating a compensation signal same as the harmonic signal and amplitude of each respective load branch in a reversed phase for transmission through the power bus and the main power trunk to each respective load branch to compensate the harmonic signal and virtual work of each respective load branch.

Other advantages and features of the present invention will be fully understood by reference to the following specifica-

DETAILED DESCRIPTION OF THE PREFERRED EMBODIMENT

Figure 1:
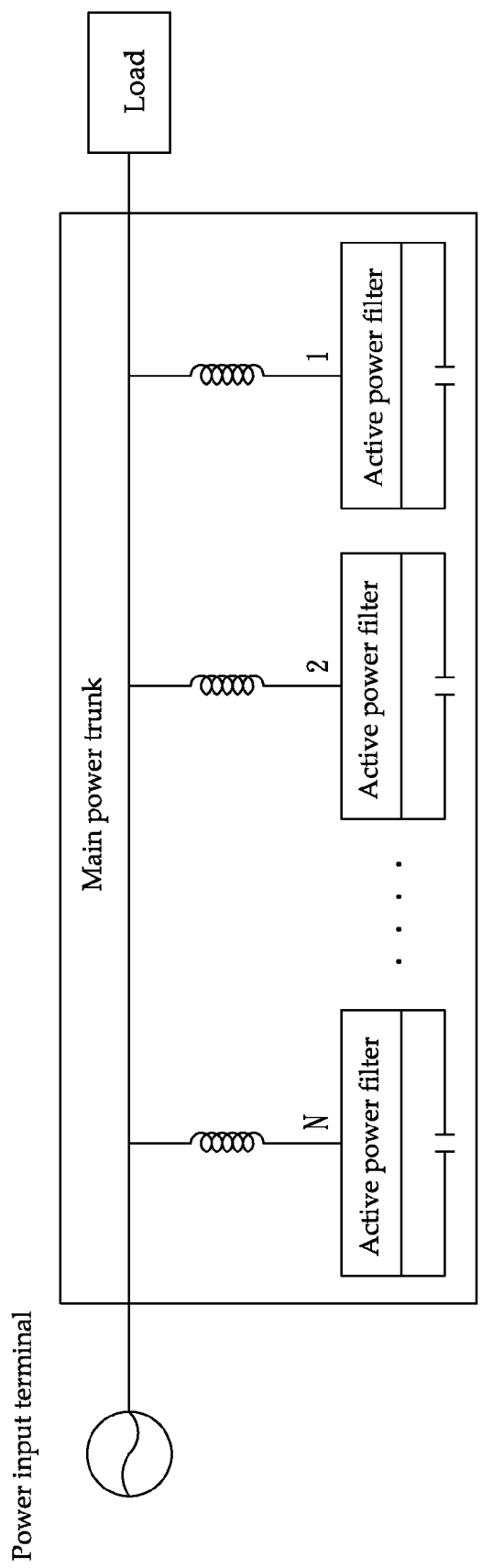
FIG. 1 is a system block diagram of a load current sensing system according to the prior art.
Figure 2:
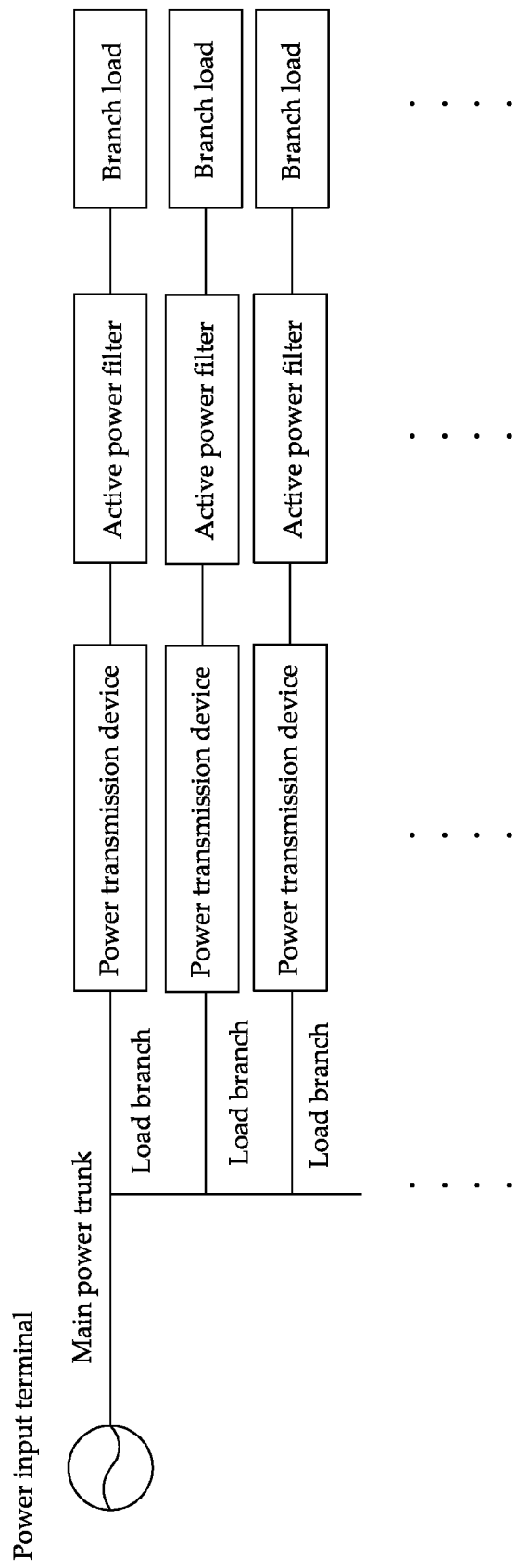
FIG. 2 is a system block diagram of another load current sensing system according to the prior art.
Figure 3:
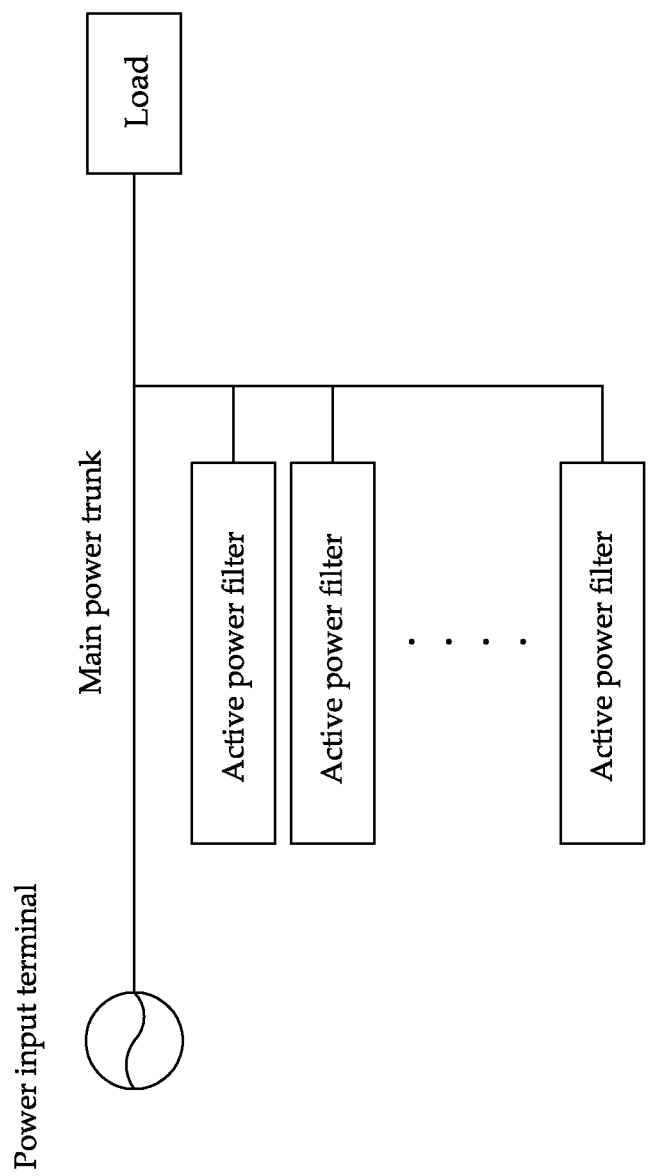
FIG. 3 is a system block diagram of still another load current sensing system according to the prior art.
Figure 4:
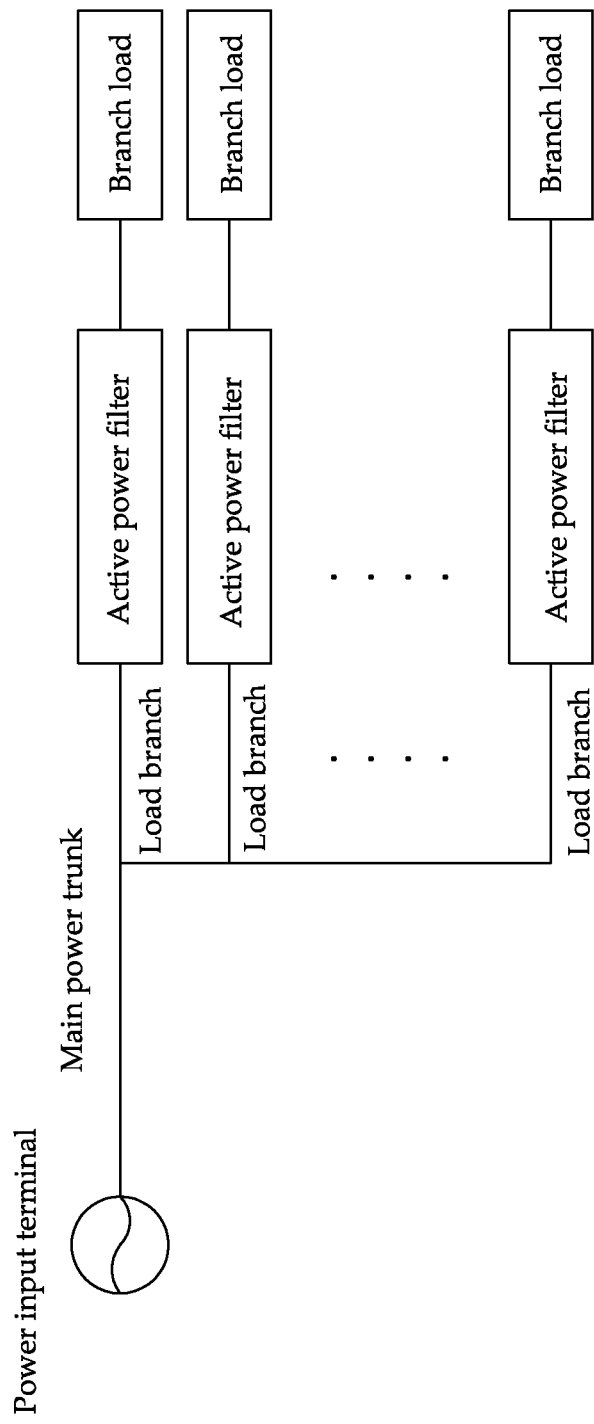
FIG. 4 is a system block diagram of still another load current sensing system according to the prior art.
Figure 5:
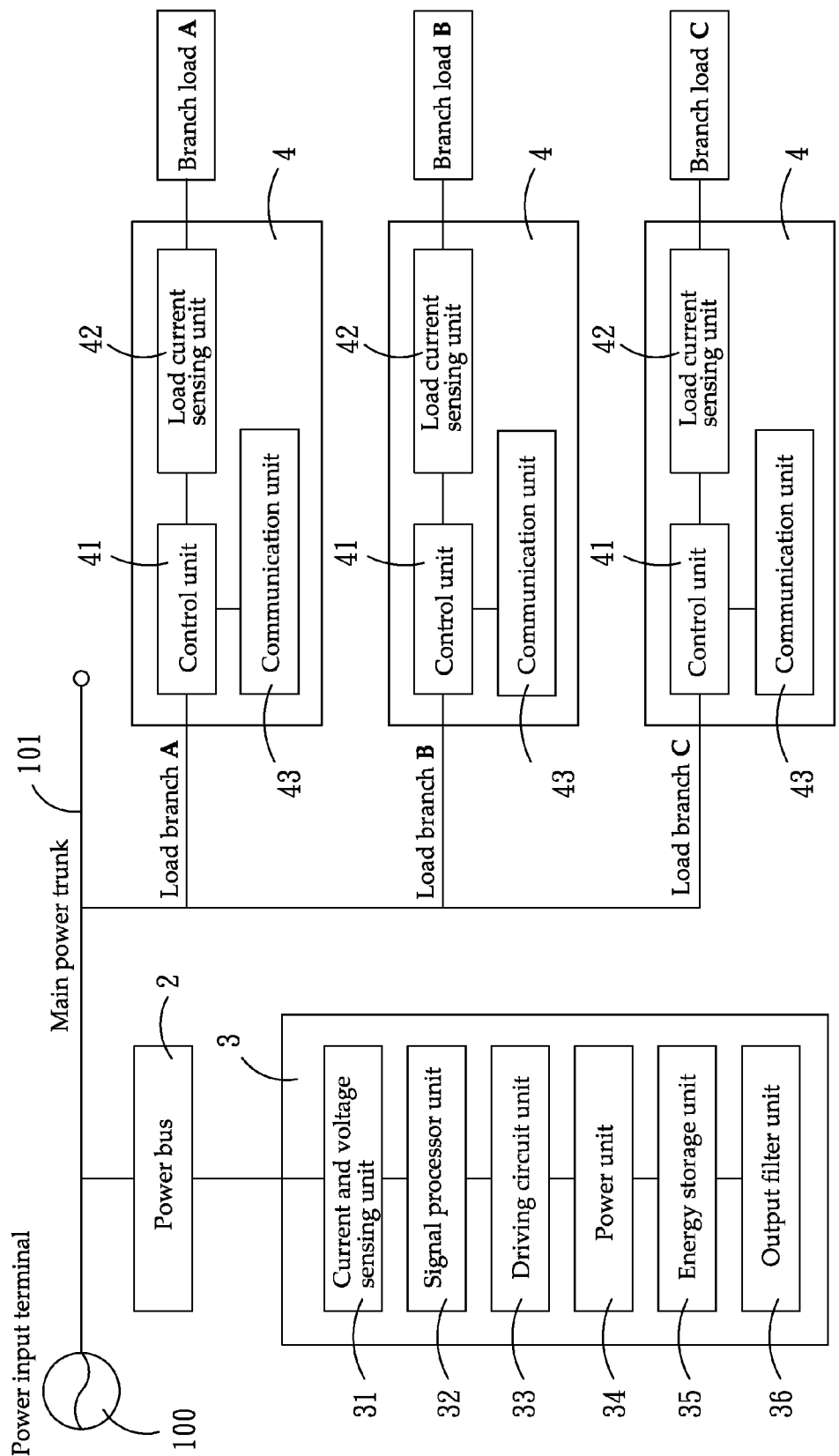
FIG. 5 is a system block diagram of a distributed load current sensing system in accordance with a first embodiment the present invention.

Referring to FIG. 5, a distributed load current sensing system in a one-to-multiple operation form in accordance with a first embodiment of the present invention is shown installed in a power input terminal 100 that is connected to a main power trunk 101 that has at least one, for example, three load branches A, B and C connected thereto. The main power trunk 101 is electrically coupled with a power bus 2 that is electrically connected to an active power filter 3. The active power filter 3 comprises a current and voltage sensor unit 31, a signal processor unit 32, a driving circuit unit 33, a power unit 34, an energy storage unit 35 and an output filter unit 36 respectively coupled with one another. Further, each load branches A, B and C each have a respective load current sensor device 4 connected thereto. These load current sensor devices 4 are directly installed in the respective load branch branches A, B and C to reduce the sensing range of the respective load current sensor devices 4, wherein each load current sensor device 4 comprises a control unit 41, a load current sensing unit 42 and a communication unit 43. The control unit 41 is respectively electrically connected to the load current sensing unit 42 and the communication unit 43. The load current sensing unit 42 is adapted for measuring the load current of the respective load branch A, B or C. The control unit 41 is adapted for receiving the measured load current from the associating load current sensing unit 42 for transmission through the associating communication unit 43 to the active power filter 3. Further, the communication unit 43 can be configured subject to a wireless communication interface configured subject to a predetermined wireless communication protocol such as WIFI or Bluetooth. Alternatively, the communication unit 43 can be a wired communication interface such as RS232, RS484. Further, the load current sensor devices 4 are respectively connected with a respective branch load A, B or C.

Referring to FIG. 5 again, when compared with the prior art design, the main feature of the present invention is the installation of the respective load current sensor device 4 in each respective load branch A, B or C to reduce the responsible sensing range of the respective load current sensor device 4. The load current data collected by the load current sensing unit 42 is transmitted through the communication unit 43 to the active power filter 3 for controlling the load branches A, B and C subject to the control of the control unit 41. The active power filter 3 analyzes the load current signal from each of the load branches A, B and C. The voltage signal received by the current and voltage sensor unit 31 from the power input terminal 100 and the compensation current feedback signal are computed and processed by the signal processor unit 32 and then provided to the driving circuit unit 33, causing the driving circuit unit 33 to drive the power unit 34 to generate a respective compensation signal that is same as the harmonic signal and amplitude of each respective load branch A, B or C but opposite in phase and to control the output operation of the energy storage unit 35 and the output filter unit 36. The output signals from the active power filter 3 are transmitted through the power bus 2 and the main power trunk 101 to the respective load branches A, B and C to compensate the harmonic signals of the respective load branches A, B and C and the virtual work, thereby obtaining more accurate sensing signals, making more timely and accurate harmonic compensation.

Figure 6:
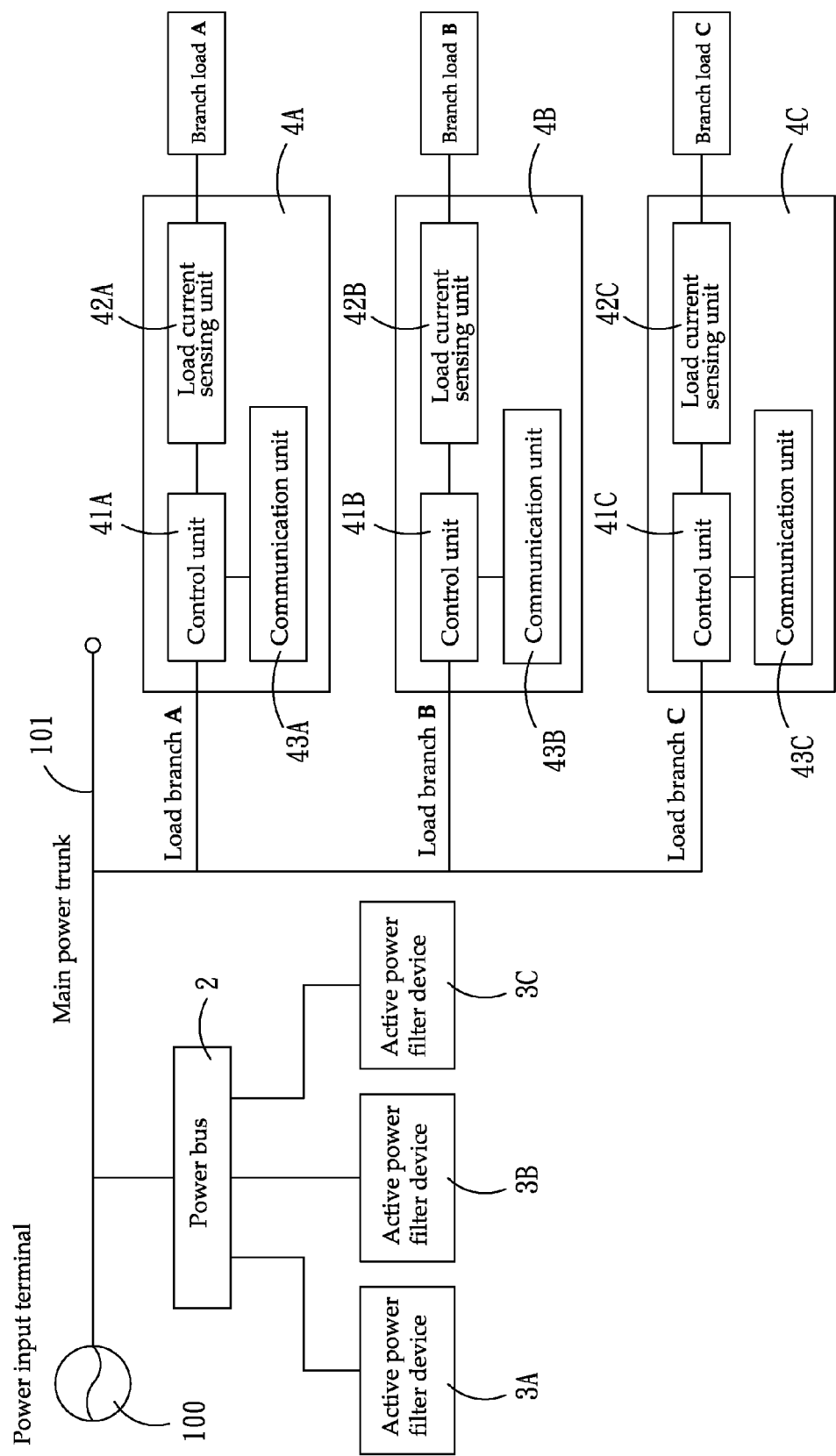
FIG. 6 is a system block diagram of a distributed load current sensing system in accordance with a second embodiment the present invention

Referring to FIG. 6, a distributed load current sensing system in a multiple-to-multiple operation form in accordance with a second embodiment the present invention is shown. In this embodiment, the power bus 2 is electrically coupled with a plurality of active power filters 3A, 3B and 3C; the main power trunk 101 is electrically coupled with a plurality of load branches A, B and C; the load branches A, B and C are respectively electrically connected to respective load current sensor devices 4A, 4B and 4C that are respectively electrically connected to respective load branches A, B and C; the load current sensor devices 4A, 4B and 4C are respectively electrically connected to respective active power filters 3A, 3B and 3C; the respective internal load current sensing units 42A, 42B and 42C of the load current sensor devices 4A, 4B and 4C are adapted to detect the respective load currents and to provide the respective detected load current data to respective control units 41A, 41B and 41C, enabling respective control units 41A, 41B and 41C to feed the respective detected load current data through respective communication units 43A, 43B and 43C to the respective active power filters 3A, 3B and 3C for analysis so that the active power filters 3A, 3B and 3C can provide respective compensation signals through the power bus 2 and the main power trunk 101 to the respective load branches A, B and C to compensate the harmonic signals and virtual work of the respective load branches A, B and C.

Figure 7:
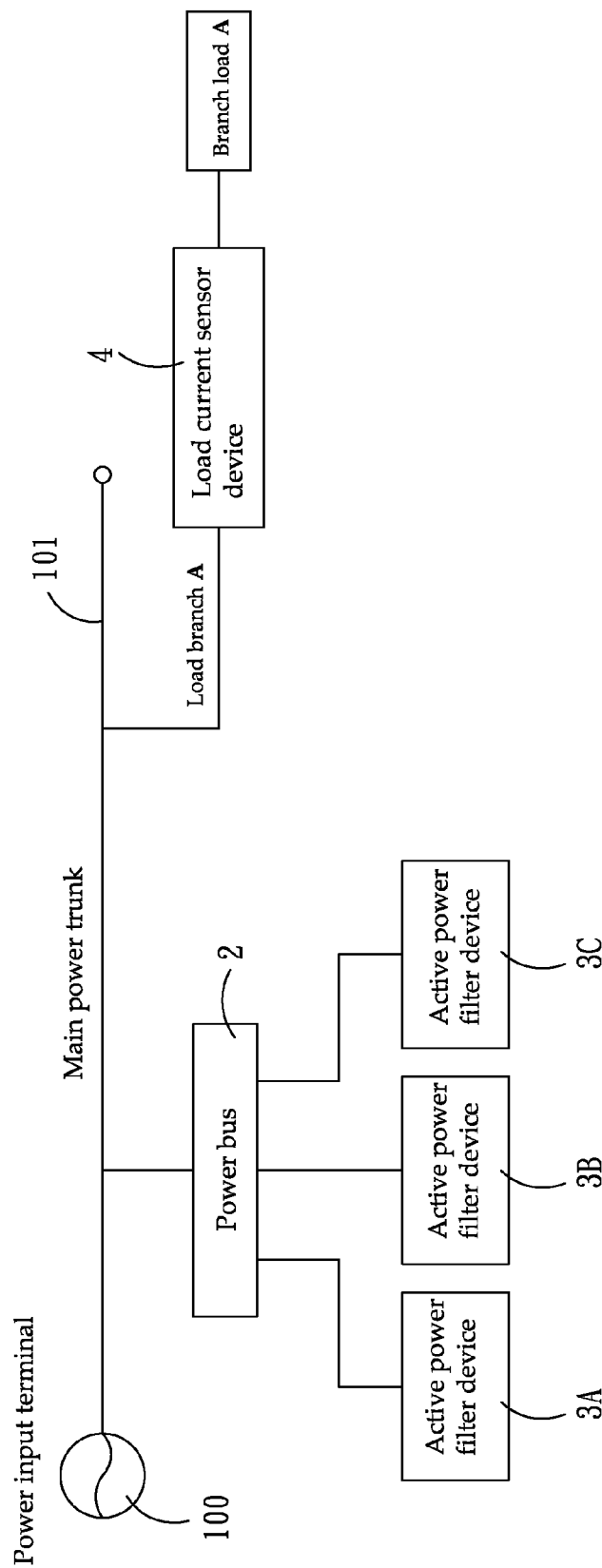
FIG. 7 is a system block diagram of a distributed load current sensing system in accordance with a third embodiment the present invention

Referring to FIG. 7, a distributed load current sensing system in a multiple-to-one parallel operation form in accordance with a third embodiment the present invention is shown. In this embodiment, the power bus 2 is electrically coupled with a plurality of active power filter 3A, 3B and 3C; the main power trunk 101 is electrically connected with one load branch A that is electrically connected to a load current sensor device 4; the load current sensor device 4 has a load current sensing unit 42 built therein for detecting the load current, enabling the detected load current signal to be transmitted through the communication unit 43 to the corresponding active power filters 3A, 3B and 3C for analysis; the current and voltage sensor units 31 of the active power filters 3A, 3B and 3C receive the voltage signal of the power input terminal 100 and the compensation current feedback signal for analysis so that each of the active power filters 3A, 3B and 3C can provide a respective compensation signal through the power bus 2 and the main power trunk 101 to the load branch A to compensate each harmonic signal and virtual work of the load branches A.

Figure 8:
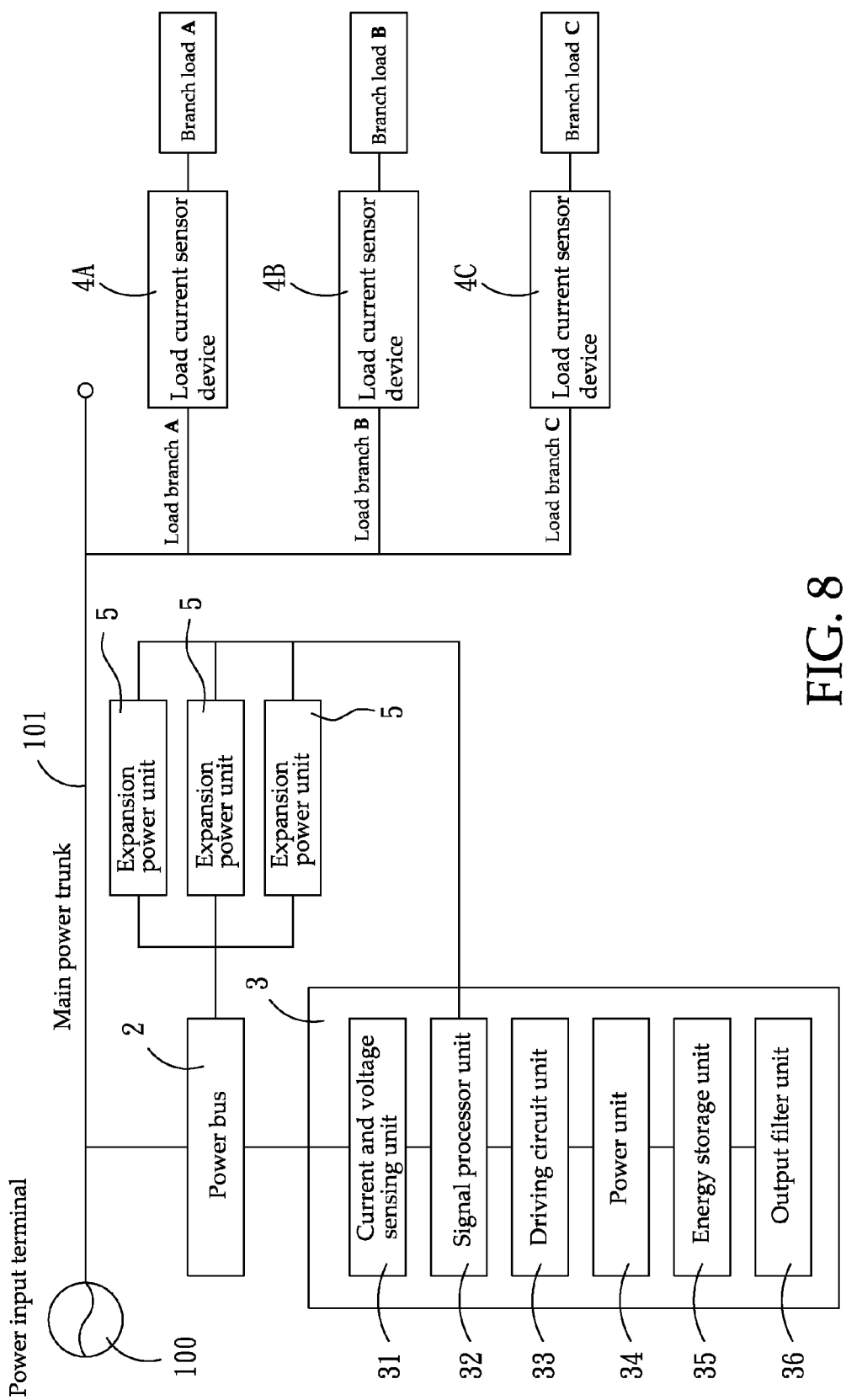
FIG. 8 is a system block diagram of a distributed load current sensing system in accordance with a fourth embodiment the present invention

Referring to FIG. 8, a distributed load current sensing system in accordance with a fourth embodiment the present invention is shown. In this embodiment, the power bus 2 is electrically coupled to at least one, for example, three expansion power units 5 that are respectively electrically connected to the signal processor unit 32 of the active power filter 3; in order to prevent the problem of system compensation failure due to that the maximum compensation capacity of the active power filter 3 cannot satisfy the demand of the load branches A, B and C for full load, the active power filter 3 parse out baseband signals and harmonic from the load current signals of the load branches A, B and C been sensed by the load current sensor devices 4A, 4B and 4C for computing and analysis by the signal processor unit 32; if the compensation capacity of the active power filter 3 cannot satisfy the capacity of the load branch A, B or C, the signal processor unit 32 of the active power filter 3 will start up a multi-power unit mode to generate a driving signal for driving at least one the expansion power units 5 to generate, according to the computed result of the signal processor unit 32, a compensation signal same as the fixed harmonic of the harmonic signal of the load branch A, B or C but in a proportional relationship relative to the amplitude and in a reversed phase, enabling the compensation signal to be transmitted through the power bus 2 and the main power trunk 101 to the load branch A, B or C to compensate the harmonic signal and virtual work of the load branch the load branch A, B or C.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A distributed load current sensing system connected to a power input terminal that is connected to a main power trunk, said main power trunk having connected thereto at least one load branch, the distributed load current sensing system comprising:
a power bus electrically connected to said main power trunk;
an active power filter electrically connected to said power bus, said active power filter comprising:
a signal processor unit adapted to analyze each received signal and output a corresponding signal;
a driving circuit unit electrically connected to said signal processor unit for receiving the output signal of said signal processor unit and outputting a corresponding driving signal;
a power unit electrically connected to said driving circuit unit for receiving said driving signal and generating a corresponding compensation signal; and
a load current sensor device electrically connected to said load branch, said load current sensor device comprising a control unit and a load current sensing unit, said control unit being electrically coupled with said load current sensing unit, said load current sensing unit being adapted for sensing the load current of each said load branch and transmitting each sensed signal to said control unit and then said active power filter; said active power filter being adapted for generating a compensation signal same as the harmonic signal and amplitude of each respective said load branch in a reversed phase for transmission through said power bus and said main power trunk to each respective said load branch to compensate the harmonic signal and virtual work of each respective said load branch;
wherein, said control unit has electrically connected thereto a communication unit for receiving each signal being outputted by said control unit and transmitting each received signal to said active power filter.

2. The distributed load current sensing system as claimed in claim 1, wherein said power bus has electrically connected thereto an expansion power unit, said expansion power unit being electrically connected to said signal processor unit for receiving each signal being outputted by said signal processor unit.

3. The distributed load current sensing system as claimed in claim 1, wherein, said communication unit is a wireless communication interface.

4. The distributed load current sensing system as claimed in claim 3, wherein, wherein said wireless communication interface of said communication unit is selected from the group of WIFI and Bluetooth interfaces.

5. The distributed load current sensing system as claimed in claim 1, wherein said communication unit is a wired communication interface.

6. The distributed load current sensing system as claimed in claim 5, wherein said wired communication interface of said communication unit is selected from the group of RS232 and RS484.

* * * * *